United States Patent
Powell et al.

(10) Patent No.: US 8,098,691 B2
(45) Date of Patent: Jan. 17, 2012

(54) BASE-BAND ETHERNET OVER POINT-TO-MULTIPOINT SHARED SINGLE CONDUCTOR CHANNEL

(75) Inventors: Scott Powell, Carlsbad, CA (US); Ali Abaye, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 815 days.

(21) Appl. No.: 11/907,500

(22) Filed: Oct. 12, 2007

(65) Prior Publication Data

US 2009/0080346 A1 Mar. 26, 2009

Related U.S. Application Data

(60) Provisional application No. 60/874,009, filed on Dec. 11, 2006.

(51) Int. Cl.
*H04J 3/08* (2006.01)
*H04J 3/17* (2006.01)
*H04L 12/28* (2006.01)
*G06F 13/36* (2006.01)
*G06F 15/16* (2006.01)

(52) U.S. Cl. .............. 370/503; 370/389; 370/395.53; 370/434; 370/468; 370/480; 370/230; 370/351; 370/392; 370/394; 370/465; 710/20; 710/33; 710/312; 709/213; 709/250

(58) Field of Classification Search .......... 370/230–503; 710/20–33; 709/213–250
See application file for complete search history.

(56) References Cited

U.S. PATENT DOCUMENTS

| 4,498,169 | A | 2/1985 | Rozmus |
| 6,334,219 | B1 * | 12/2001 | Hill et al. ............... 725/106 |
| 6,535,715 | B2 * | 3/2003 | Dapper et al. ........... 455/3.05 |

(Continued)

FOREIGN PATENT DOCUMENTS

EP 0 540 188 A1 10/1992

(Continued)

OTHER PUBLICATIONS

Charles E. Spurgeon, "Ethernet: The Definitive Guide Designing and Managing Local Area Networks", 2000.

(Continued)

*Primary Examiner* — Ayaz Sheikh
*Assistant Examiner* — Venkatesh Haliyur
(74) *Attorney, Agent, or Firm* — Sterne, Kessler, Goldstein & Fox P.L.L.C.

(57) ABSTRACT

A method for point-to-point ethernet communication over point-to-multipoint shared single conductor channel topology comprises transmitting an ethernet signal upstream over the point-to-multipoint topology from one end point of the topology to the root of the topology, transmitting the ethernet signal downstream over the point-to-multipoint topology from the root of the topology to all end points of the topology, and selectively processing only at a designated end point the ethernet signal received at all end points. An ethernet system may comprise single conductor channel cabling (e.g., coaxial cabling) including a trunk line and a plurality of branch lines connecting to the trunk line at a plurality of points along the trunk line, a single root transceiver (root-PHY) connected at an end of the trunk line, and a plurality of end point transceivers (EP-PHYs), each connected to a respective one of the plurality of branch lines. The system and method further may communicate with an external network, such as the internet, via the root of the topology.

24 Claims, 8 Drawing Sheets

U.S. PATENT DOCUMENTS

| | | | |
|---|---|---|---|
| 6,580,723 B1* | 6/2003 | Chapman | 370/442 |
| 6,731,649 B1* | 5/2004 | Silverman | 370/466 |
| 6,807,148 B1* | 10/2004 | Eicher | 370/217 |
| 6,813,651 B1* | 11/2004 | Smith et al. | 710/20 |
| 7,050,419 B2* | 5/2006 | Azenkot et al. | 370/347 |
| 7,069,577 B2* | 6/2006 | Geile et al. | 725/106 |
| 7,102,513 B1* | 9/2006 | Taskin et al. | 340/540 |
| 7,218,901 B1* | 5/2007 | Mobley et al. | 455/182.2 |
| 7,251,703 B1* | 7/2007 | Wu et al. | 710/312 |
| 7,349,391 B2* | 3/2008 | Ben-Dor et al. | 370/392 |
| 7,400,637 B1* | 7/2008 | Chapman | 370/403 |
| 7,423,970 B2* | 9/2008 | Wang et al. | 370/235 |
| 7,428,222 B1* | 9/2008 | Wu et al. | 370/257 |
| 7,496,078 B2* | 2/2009 | Rahman | 370/338 |
| 7,505,455 B1* | 3/2009 | Goodwin et al. | 370/356 |
| 7,519,081 B2* | 4/2009 | Sorenson et al. | 370/468 |
| 7,590,145 B2* | 9/2009 | Futch et al. | 370/466 |
| 7,630,639 B2* | 12/2009 | Kramer et al. | 398/72 |
| 7,822,064 B2* | 10/2010 | Thubert et al. | 370/468 |
| 2002/0061012 A1* | 5/2002 | Thi et al. | 370/352 |
| 2002/0069417 A1* | 6/2002 | Kliger et al. | 725/78 |
| 2002/0141418 A1* | 10/2002 | Ben-Dor et al. | 370/398 |
| 2003/0224784 A1* | 12/2003 | Hunt et al. | 455/426.2 |
| 2005/0002402 A1* | 1/2005 | Fairman | 370/395.5 |
| 2006/0153155 A1* | 7/2006 | Jacobsen et al. | 370/338 |
| 2006/0215561 A1* | 9/2006 | Wang et al. | 370/235 |
| 2006/0256799 A1* | 11/2006 | Eng | 370/401 |
| 2007/0206537 A1* | 9/2007 | Cam-Winget et al. | 370/331 |
| 2007/0248024 A1* | 10/2007 | Conway et al. | 370/252 |
| 2007/0294738 A1* | 12/2007 | Kuo et al. | 725/116 |
| 2008/0043637 A1* | 2/2008 | Rahman | 370/254 |
| 2008/0080414 A1* | 4/2008 | Thubert et al. | 370/328 |
| 2009/0092154 A1* | 4/2009 | Malik et al. | 370/480 |
| 2011/0060859 A1* | 3/2011 | Shukla et al. | 710/314 |

FOREIGN PATENT DOCUMENTS

| | | | |
|---|---|---|---|
| EP | 1933505 A2 * | 6/2008 | |
| KR | 10-2004-108256 | 12/2004 | |

OTHER PUBLICATIONS

European Search Report issued in EP Appl. No. 07022244 on Aug. 5, 2008, (3 pages).

* cited by examiner

BASE-BAND ETHERNET OVER POINT-TO-MULTIPOINT SHARED SINGLE CONDUCTOR CHANNEL

CROSS-REFERENCE TO RELATED APPLICATIONS

The present application claims the benefit of U.S. Provisional Patent Application No. 60/874,009, filed Dec. 11, 2006 which is incorporated herein by reference in its entirety.

BACKGROUND OF THE INVENTION

1. Field of the Invention

The present invention relates generally to baseband ethernet systems and methods, and more particularly to elements, systems and methods for providing baseband ethernet communication over point-to-multipoint shared single line conductor channel topology.

2. Background

Ethernet is a local area network (LAN) technology that connects a variety of computers together in a flexible network system. Ethernet communication generally refers to point-to-point communication within a network of multiple end points. That is, ethernet permits one end point of a network to communicate with another end point of the network, and vice-versa.

Figure 1:
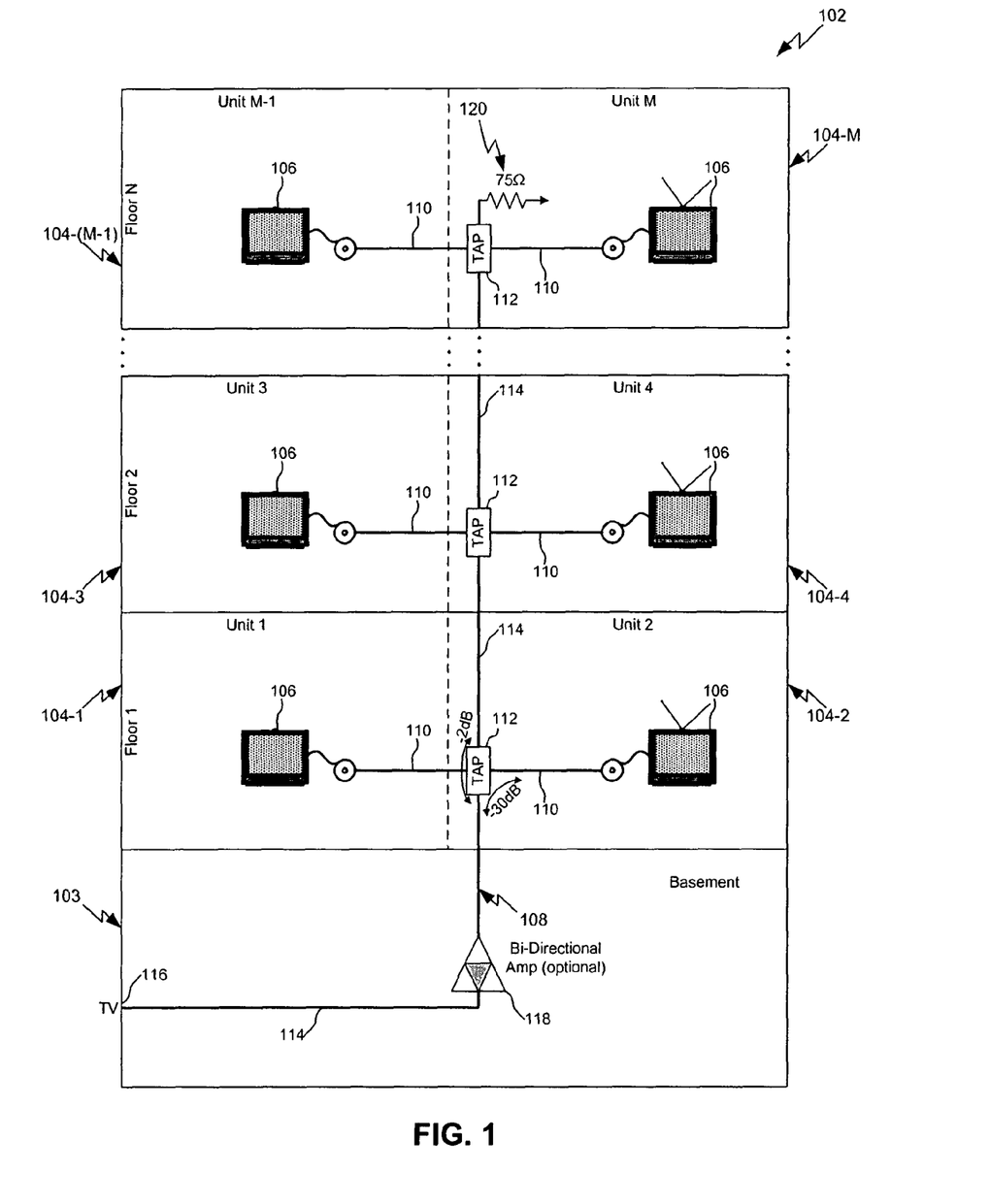
FIG. 1 schematically illustrates a multi-tenant unit building including coaxial cable television (CATV) cabling configured in a tree-like, point-to-multipoint topology.

Building infrastructure typically incorporates technologies that are commonly known and readily available at the time of construction. For example, FIG. 1 schematically illustrates a typical multi-tenant unit (MTU) building 102 provided with well known cable television (CATV) technology. Generally, the MTU building 102 includes a basement level 103 and a plurality of units (e.g., units 1-M) 104. A unit 104 may be an apartment, a condominium, an office, or the like. The units 104 variously may be located on a plurality of floors (e.g., floors 1-N). For simplicity of illustration and explanation, only the basement 103 and floors 1, 2 and N (including units 1-4, M-1 and M) are illustrated in FIG. 1. The remaining floors and units are structurally and functionally similar to the illustrated floors and units, and therefore are not shown in detail. Each unit 104 may include a television (TV) 106. A TV 106 may include a simple connector that directly receives an input signal. Alternatively, a TV 106 may be provided with an appropriate signal converter box that decodes and/or unscrambles an input signal prior to input to the TV receiver, as is well known in the art. The MTU building 102 is provided with coaxial cable wiring for delivering CATV to the plurality of TVs 106 in respective units 104 of the MTU building 102.

The coaxial cabling 108 in the MTU building 102 is configured in a tree-like, point-to-multipoint topology. In this topology, each unit 104 receives a branch line 110 that is connected via a tap element 112 to a single (common) trunk line 114. For simplicity of illustration, in FIG. 1 each unit is shown with a single branch line 110 and a single TV 106. However, those skilled in the art readily will appreciate that each unit 104 may receive multiple branch lines 110, respectively connecting to multiple TVs. Alternatively, or in addition, a single branch line 110 may include a splitter (not shown), that provides a common signal line to multiple televisions in a single unit 104. The trunk line 114 in turn connects at one end to a service provider entry point 116 of the MTU building 102. The trunk line 114 may be any cable suitable for signal transmission, e.g., 75Ω RG-59 cable. The trunk line 114 further may include an optional bi-directional amplifier 118 provided between the service provider entry point 116 and the first tap element 112, and a terminator (e.g., resistor-to-ground) 120 provided at the end remote from the service provider entry port 116. Although the service provider entry point 116 generally may be located at any location of the MTU building 102, the service provider entry point 116 conveniently may be located in the basement 103 of the MTU building 102, as shown in FIG. 1. In this manner, the coaxial cabling 108 provides a common CATV signal from a single CATV signal source—e.g., service provider entry point 116—located in the basement 103 of the MTU building 102 to each of the plurality of TVs 106 respectively located in a plurality of units 104 of the MTU building 102. This single channel communication coaxial cabling thus may provide low cost delivery of a common CATV signal from a single source to multiple end points/units.

3. Description of Related Art

IEEE 802.3 standards define a Carrier Sense Multiple Access with Collision Detection (CSMA/CD) algorithm for shared media—commonly called ethernet. The IEEE 802.3 standards define connectivity between two transmitter-receivers (transceivers) over various media. For example, under the IEEE 802.3 standards, the 10BASE5 standard (which defines the original standards for CSMA/CD communications) defines ethernet communication standards developed for ethernet over thick coaxial cable; the 10BASE2 standard defines succeeding standards developed for ethernet over thin coaxial cable. In these coaxial cable based standards, the coaxial cable is dedicated to carrying one service—ethernet signals.

Subsequently developed standards under the IEEE 802.3 standards were developed to operate over twisted-wire pairs and fiber optic cable. Such standards include the Fiber Optic Inter-Repeater Link (FOIRL) standard, the 10BROAD36 standard (a broadband system), the 1BASE5 standard (a 1 Mbps twisted-pair wiring system), the 10BASE-T standard (a 10 Mbps twisted pair wiring system), the 10BASE-F standard (fiber optic based systems), and the 10BASE-T, 110BASE-T2, 10BASE-T4 and 10BASE-X standards (twisted-wire pair and fiber optic systems that operate at 100 Mbps). More recent standards developed under the IEEE 802.3 standards include the 1000BASE-X and 1000BASE-T standards (twisted-wire pairs and optic fiber systems that operate at 1000 Mbps).

In ethernet point-to-point communication, one end point (e.g., an originating end point) generally may be referred to as the master, and the other end point generally may be referred to as the client or slave. In operation, the master may define and transmit a master clock (pulse signal) to the slave; in transmitting a response to the master, the slave may synchronize with the master by recovering (also known as slaving off of or timing off of) the master clock transmitted from the master. In a typical ethernet system, however, all end points generally have the same priority, and each end point may perform point-to-point communication with multiple end points of the network over a given period of time.

As noted above, recently developed IEEE 802.3 standards define ethernet communication standards over fiber optic or twisted pair wiring, e.g. two or four twisted pair wirings; these media permit high speed, full-duplex communication between a master and slave—that is, continuous communication in both directions between the master and the slave. In this manner, communications by any 'master' or 'slave' generally may be sequential or simultaneous.

Coaxial cabling as illustrated in FIG. 1, which offers only a single conductor channel in a tree-like, point-to-multipoint topology, generally is incompatible with IEEE 802.3 standards signaling. The tree-like, point-to-multipoint configuration of FIG. 1 provides a single communication channel that is shared by all users—that is, each user receives a common signal broadcast over a shared, single communication channel. In this case, the signal is broadcast in a single direction downstream over the shared channel. In this manner, a signal may be continuously broadcast from a single source to multiple end points—in this example, a cable TV signal (CATV) may be broadcast over coaxial cable from a single source (service provider entry point) to multiple television sets located in respective multiple units of the MTU building. IEEE 802.3 standards generally cannot be implemented directly on the cable plant of FIG. 1 for at least the following reasons:

1). End points often are isolated from each other through high loss tap elements and cannot reliably detect the presence/absence of communication traffic on the trunk line. For example, a tap element may introduce a 2 dB signal loss in a direction of the trunk line 114 and a 30 dB signal loss across a trunk-branch line connection.

2). Ethernet speeds higher than 10 Mbps utilize continuous transmission protocol. If no data is present, then end points typically transmit idle signals. Idle signals from non-transmitting end-points may interfere with a data signal from a transmitting end-point.

3). CSMA/CD assumes that all end points have equal priority. However, in a topology as shown in FIG. 1, data rates required in the downstream direction ("to" the end points) may be significantly higher than data rates required in the upstream direction ("from" the end points). Particularly in pre-existing applications, it also may be desirable to maintain pre-existing transmission functionality in the downstream direction simultaneously broadcast to all end points (e.g., CATV).

Much infrastructure built over the past few decades does not incorporate ethernet technologies that developed rapidly over the same period of time. Where an MTU building is not pre-wired with fiber optic or data-grade twisted pair wire cabling, it cannot be up-graded to use IEEE 802.3 ethernet to deliver access to broadband services to a plurality of individual units without significant investment in rewiring. A simple ethernet upgrade for preexisting infrastructures is needed.

SUMMARY OF THE INVENTION

Aspects of the present invention relate to systems and methods for providing baseband ethernet communication over point-to-multipoint shared single conductor channel topology. In exemplary embodiments, the invention provides systems and methods for baseband ethernet over coaxial cable (EOC), such as existing CATV coaxial cabling in a multi-tenant unit (MTU) building.

Additional aspects of the present invention relate to transmitter/receivers (transceivers), including root transceivers (root-PHYs) and end point transceivers (EP-PHYs), and systems and methods using such root- and EP-PHYs for providing baseband ethernet communication over point-to-multipoint shared single conductor channel topology, such as CATV coaxial cabling.

BRIEF DESCRIPTION OF THE DRAWINGS

The accompanying drawings, which are incorporated herein and form a part of the specification, illustrate exemplary embodiments of the present invention and, together with the written description, further serve to explain the principles of the invention and to enable a person skilled in the art to make and use the invention.

Embodiments of the present invention will be described with reference to the accompanying drawings, wherein like reference numbers designate like or similar elements or features throughout the drawings. The drawing in which an element first appears typically is indicated by the leftmost digit in the corresponding reference number.

DESCRIPTION OF EMBODIMENTS

Exemplary embodiments of the present invention include elements, systems and methods for providing ethernet communication over a point-to-multipoint shared single conductor channel. In an exemplary embodiment, the point-to-multipoint shared single conductor channel may be coaxial cable, thus providing ethernet over coaxial cable (EOC). Application of such embodiments may include elements, systems and methods for delivering ethernet over existing, built-in coaxial cable provided in a point-to-multipoint topology, e.g., television (CATV) cabling, thereby enabling low cost delivery of broadband access without the need for expensive re-wiring.

Figure 2:
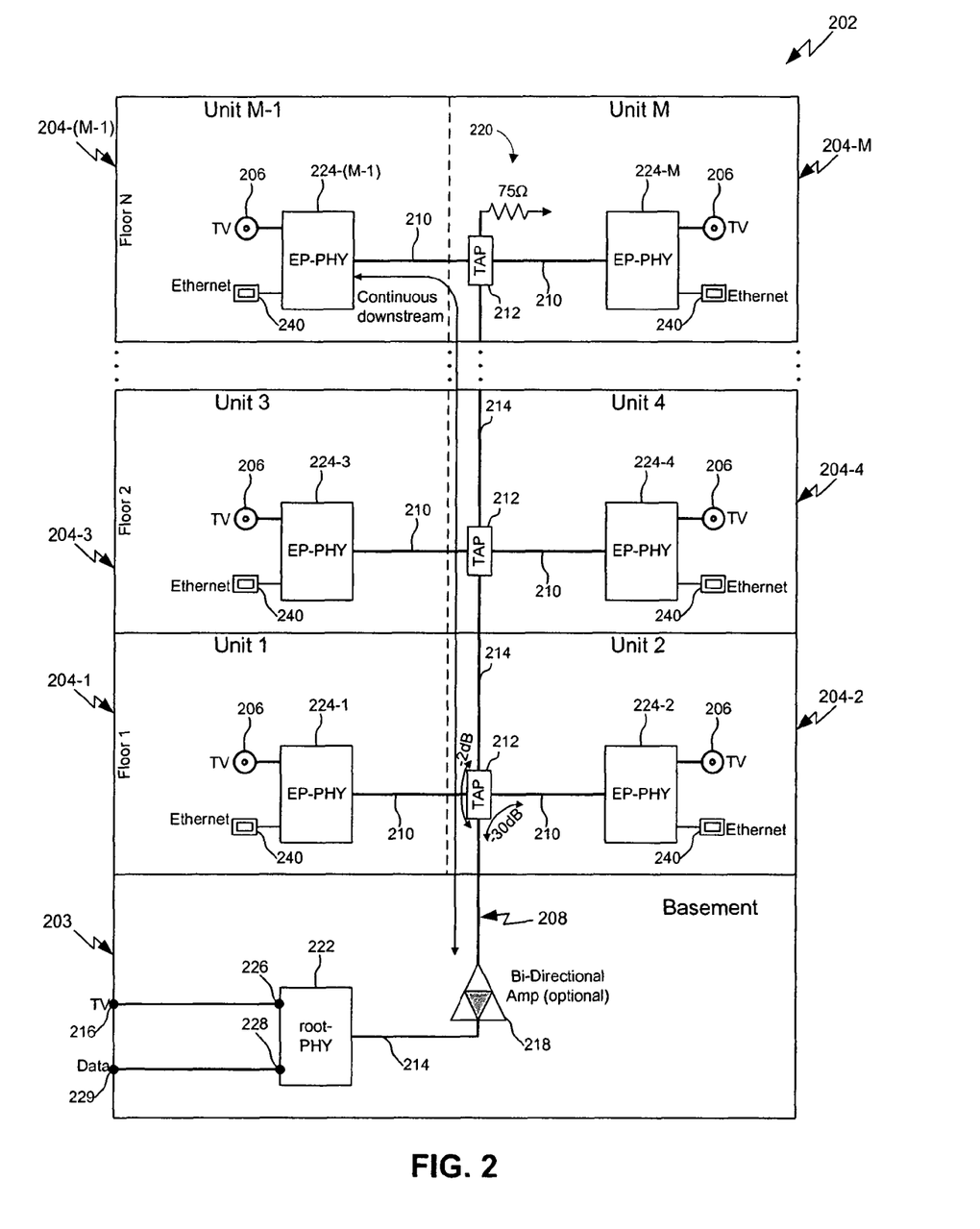
FIG. 2 schematically illustrates embodiments of a baseband ethernet system over point-to-multipoint shared single conductor channel cabling.

FIG. 2 schematically illustrates exemplary embodiments of ethernet over point-to-multipoint shared single conductor channel elements, systems and methods of the present invention. Specifically, FIG. 2 schematically illustrates exemplary embodiments of ethernet-over-coaxial (EOC) elements, systems and methods that implement the present invention.

Similar to FIG. 1 above, FIG. 2 schematically illustrates a multi-tenant unit (MTU) building 202 provided with coaxial cabling 208. Generally, the MTU building 202 includes a basement 203 level and a plurality of units (e.g., units 1-M) 204. A unit 204 may be an apartment, a condominium, an office, or the like. The units 204 variously may be located on a plurality of floors (e.g., floors 1-N). For simplicity of illustration and explanation, only the basement 203 and floors 1, 2 and N (units 1-4, M−1 and M) are illustrated in FIG. 2. The remaining floors and units are structurally and functionally similar to the illustrated floors and units, and therefore are not shown in detail. The MTU building is provided with coaxial cable wiring and ethernet elements and systems for delivering CATV to the plurality of TVs and ethernet access to the plurality of units in the MTU building.

As shown in FIG. 2, an exemplary ethernet system generally includes a root transmitter/receiver (transceiver) 222 and multiple end point transceivers 224 configured over coaxial cabling 208 in a tree-like topology.

The coaxial cabling 208 in the MTU building 202 is configured in a tree-like, point-to-multipoint topology, substantially similar to the topology illustrated in FIG. 1. In this topology, each unit 204 receives a branch line 210 that is connected via a tap element 212 to a single (common) trunk line 214. For simplicity of illustration, in FIG. 2 each unit 204 is shown with a single branch line 210. However, those skilled in the art readily will appreciate that each unit 204 may receive multiple branch lines 210. Alternatively, or in addition, a single branch line 210 may include a splitter (not shown), that provides a common signal to multiple end point transceivers 224 in a single unit 204. The trunk line 214 may be any cable suitable for signal transmission, e.g., 75Ω RG-59 cable. The trunk line 214 further may include an optional bi-directional amplifier 218 provided between the root-PHY 222 and the first tap element 112, and a terminator (e.g., resistor-to-ground) 220 provided at the end remote from the root-PHY 222.

It will be appreciated that the elements, systems and methods of the present invention readily may be implemented over pre-existing coaxial cabling of an MTU building, such as the CATV coaxial cabling network illustrated in FIG. 1. As discussed in greater detail below, in an exemplary embodiment, existing built-in coaxial CATV cabling provided in a tree-like point-to-multipoint topology in an MTU building readily may be modified to provide ethernet elements, systems and methods of the present invention, while maintaining delivery of CATV.

As shown in FIG. 2, in an exemplary embodiment the system may include a single root transceiver (root-PHY) 222, existing near a service provider entry point 216 (e.g., in the basement 203), and a plurality of end-point transceivers (EP-PHYs) 224, located in respective units 204 of the MTU building 202.

As used herein, PHY generally refers to a physical layer device of an ethernet system. A PHY optionally and variously may include any known or later developed media attachment unit (MAU), attachment unit interface (AUI), media dependent interface (MDI) or media independent interface (MII) suitable for a desired application. A PHY may use any known or later developed ethernet signal encoding scheme and media access control (MAC) protocol suitable for a desired application. As used herein, encoding may include combining clock and data information into a self-synchronizing stream of signals. A PHY further may include various modules and/or sub-modules (each including hardware and/or software), and variously may use different combinations of modules and/or sub-modules for implementing the ethernet encoding schemes and MAC to perform ethernet communications. Those skilled in the art readily will be able to select or adapt suitable ethernet hardware, software, interface, signal encoding and media access control for a desired application.

Root-PHY

In an exemplary embodiment of FIG. 2, root-PHY 222 may include an external media connector (e.g., a CATV cable port) 226 that connects to, and receives an input signal from, the service provider entry point 216. In an exemplary embodiment of FIG. 2, the input signal may be a continuous analog signal, such as a CATV signal. However, the input signal type is not limited and may be any signal type provided that it may be converted to a signal type suitable for transmission over the system media. For example, an adaptor or converter, such as a digital-to-analog converter, may be provided internally or externally of the root-PHY to convert an input signal to a desired system signal format. Those skilled in the art readily will be able to configure root-PHY elements and systems to accommodate alternative technologies and embodiments suitable for a desired application.

In an exemplary embodiment of FIG. 2, root-PHY 222 also may include an optional external network data signal connector 228 that connects to an external network port 229. The network data signal carrier media may be any known (e.g., optical or electrical) or later developed signal carrier media. An adaptor or converter may be provided to convert an incoming or outgoing network data signal to a desired signal format for a desired media. In the case of an optical signal, for example, as shown in an exemplary embodiment of FIG. 3 (discussed further below), root-PHY 222 may include an internet connection port, such as a 100TX Ethernet RJ-45 jack, that connects to external optical fiber network port 229 via optical cable 230 and an optical-to-electric converter 232. Those skilled in the art readily will be able to configure root-PHY elements and system to accommodate alternative technologies and embodiments suitable to a desired application.

In an exemplary embodiment of FIG. 2, the root-PHY 222 may be any conventional, proprietary or later-developed transmitter/receiver configured for providing physical layer/interface and communication functionality disclosed in this specification. In an exemplary embodiment of FIG. 2, the root-PHY 222 may be configured to receive a signal from an external signal source, such as a continuous CATV signal, and to transmit (broadcast) the signal downstream over single conductor channel cabling to each of the plurality of EP-PHYs 224. The root-PHY 222 also may be configured to receive data signals transmitted upstream over the single conductor channel cabling from the plurality of EP-PHYs 224, and to transmit (broadcast) the data signals downstream over the single conductor channel cabling to each of the plurality of EP-PHYs 224, thereby to provide ethernet communication from any one of the EP-PHYs 224 to a desired other one (or more) EP-PHY 224.

The root-PHY 222 further optionally may be configured to receive data signals from, and transmit data signals over, an external network, such as the internet. In an exemplary embodiment, the root-PHY 222 may be configured to receive data signal(s) transmitted upstream over the single conductor channel cabling from the plurality of EP-PHYs 224, and to transmit the data signal(s) over the external network—and vice-versa—thus providing external network access (e.g., internet access) to the plurality of EP-PHYs 224 on the ethernet system.

Figure 3:
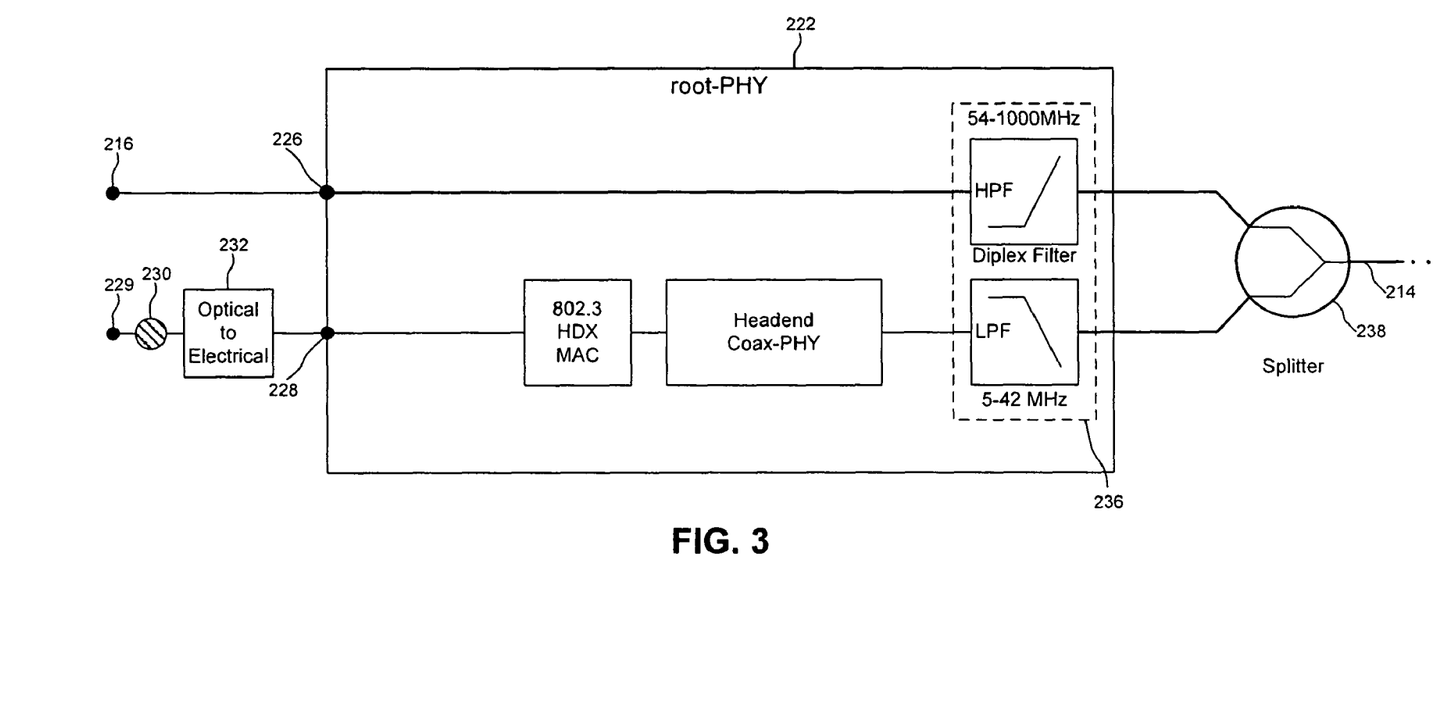
FIG. 3 schematically illustrates an exemplary root-PHY configuration that may be used with the ethernet system of FIG. 2.

In an exemplary embodiment as illustrated in FIG. 3, root-PHY 222 may include modules/sub-modules implementing IEEE 802.3 FDX MAC and Headend Coax-PHY for processing data signals received and transmitted by root-PHY 222.

The root-PHY 222 may designate a selected one of the plurality of EP-PHYs to receive the data in a data signal. In an exemplary embodiment, where the root-PHY is transmitting a continuous signal downstream over the cabling, the root-PHY 222 may include a control code in the continuous signal that designates that data in the data signal (e.g., the next data package) transmitted by the root-PHY is to be received by a selected one of the EP-PHYs 224; the selected/designated one of the EP-PHYs 224 may receive/process the control code and be enabled. Alternatively, or in addition thereto, the remaining EP-PHYs 224 may receive/process the control code and be disabled. In another exemplary embodiment a data signal itself may designate (e.g., by data supplied in a data packet) and selectively enable a selected one of the plurality of EP-PHYs 224 for receiving data in the data signal.

Those skilled in the art readily will recognize alternative structures, modules/submodules, and the like for providing a desired physical interface and performing desired communication functionality of the root-PHY transceiver, as discussed in embodiments herein.

EP-PHYs

In exemplary embodiments, each end point transceiver (EP-PHY) 224 likewise may be any conventional, proprietary or later-developed transmitter/receiver configured for providing a physical layer/interface and communication functionality as disclosed in this specification. In an exemplary embodiment, each EP-PHY 224 may be configured to receive a signal transmitted (broadcast) downstream over the single conductor channel cabling 208 from the root-PHY 222. Each EP-PHY 224 also may selectively communicate with any other one of the plurality of EP-PHYs 224 by transmitting a data signal upstream over the single conductor channel cabling to the root-PHY 222, the root-PHY 222 re-transmitting (broadcasting) the signal downstream over the single conductor channel cabling to the selected/designated other EP-PHY(s) of the plurality of EP-PHYs 224. As discussed above, the root-PHY 222 may transmit a control code (or re-transmit a control code received from an originating EP-PHY) designating a selected EP-PHY 224 to which data in the data signal (e.g., the next data packet) is directed. Alternatively, a data signal itself may designate and enable a selected EP-PHY(s) of the plurality of EP-PHYs 224.

Figure 4:
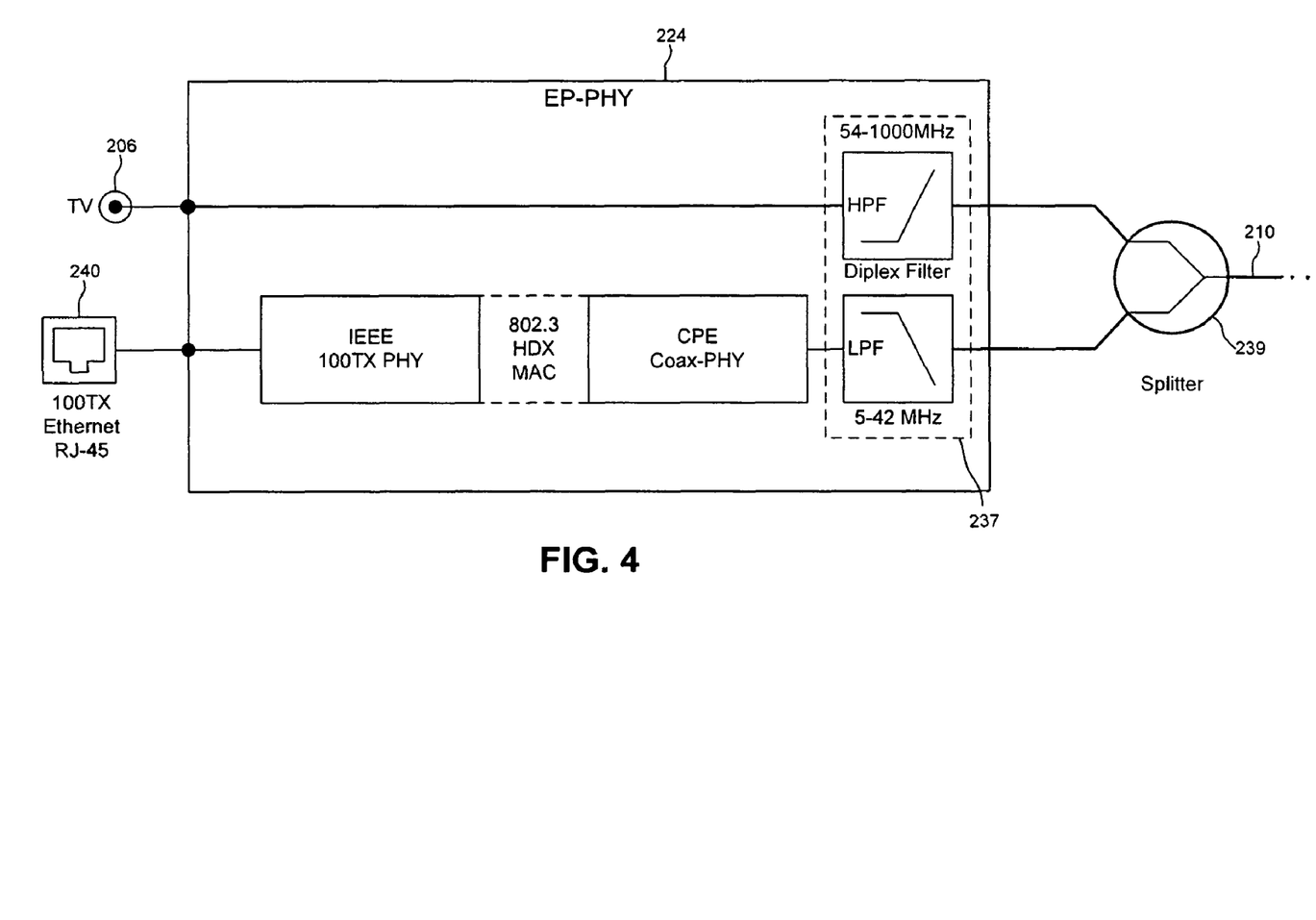
FIG. 4 schematically illustrates an exemplary EP-PHY configuration that may be used with the ethernet system of FIG. 2.

In an exemplary embodiment, as illustrated in FIG. 4, EP-PHY 224 may include an ethernet PHY module configured to interface with an ethernet port 240, and a CPE Coax-PHY module configured to interface with the coaxial cabling 208 via diplex filter 237 and splitter 239. The ethernet PHY module and the coax-PHY module may be configured to communicate directly with one another and perform a media conversion function, e.g., from coax to twisted-pair wiring, without requiring any explicit MAC. Alternatively, a MAC optionally may be provided between the ethernet PHY module and the coax-PHY module to perform this media conversion/communication function. In the exemplary embodiment illustrated in FIG. 4, EP-PHY 224 includes an IEEE 100TX PHY, 802.3 HDX MAC (optional), and CPE Coax-PHY for processing data signals received and transmitted to/from a 100TX Ethernet RJ-45 port. Of course, the EP-PHY 224 may be configured for any ethernet speed (10/100/1000/10000) and port configuration. Those skilled in the art readily will be able to select and configure various EP-PHY modules/submodules and optional MAC suitable for performing the functions of any desired ethernet application.

In exemplary embodiments, each EP-PHY 224 also optionally may be configured to access/communicate with an external network, such as the Internet, by transmitting a data signal upstream over the single conductor channel cabling via the root-PHY 222—and vice versa. Those skilled in the art readily will recognize alternative structures for providing a desired physical layer/interface and performing desired communication functionality of the EP-PHY transceivers, as discussed in embodiments herein.

Asymmetric Data Flow

In an exemplary embodiment, the root-PHY 222 and multiple EP-PHYs 224 may be arranged and configured in a network that provides asymmetric data flow. In such a system and method, root-PHY 222 may assign a unique PHY address (unique ID) to each EP-PHY 224 recognized on the network, and the root-PHY 222 may assemble and maintain, e.g., in local memory, a table of each EP-PHY 224 recognized on the network, together with its respective unique PHY address. Similarly, each EP-PHY 224 may maintain a table of the root-PHY 222 and each other EP-PHY 224 together with its respective unique PHY address. Data may be broadcast continuously in the downstream direction—from root-PHY 222 to each of the plurality of EP-PHYs 224; in this manner, the downstream connection may utilize the full data bandwidth available on the channel. In an embodiment, plural EP-PHYs 224 may share access to the upstream channel bandwidth in a time-domain multiplexed (TDM) manner. Alternatively, in an embodiment, plural EP-PHYs 224 may share access to the upstream channel bandwidth in a round robin manner. In the exemplary tree-like topography configuration, the multiple EP-PHYs 224 though not connected to one another directly, rather may be connected via root-PHY 222. In this manner, a baseband PAM transmission signal encoding scheme, similar to or the same as defined in IEEE 802.3, may be used in both directions, and both directions may share the same bandwidth. This embodiment thus may provide a desired asymmetry in data rates between upstream and downstream directions—that is, a larger amount of data may be transmitted downstream than upstream over the single conductor channel cabling.

In an exemplary embodiment, root-PHY 222 and each of the plurality of EP-PHYs 224 may utilize full duplex transmission over the coaxial channel—that is, data signals simultaneously may be transmitted in both directions over the same single conductor channel, e.g., by utilizing a different wavelength range for signals transmitted upstream and signals transmitted downstream over the system media.

In an exemplary embodiment root-PHY 222 and each EP-PHY 224 may be configured to alternately transmit and receive data over system media comprising single conductor channel cabling (half-duplex mode). That is, in an exemplary embodiment the system may implement a configuration that provides a collision avoidance protocol, rather than a collision detection protocol as set forth in the CSMA/CD IEEE 802.3 standards.

CATV & Network Data

As shown in FIGS. 2-4, in exemplary embodiments an ethernet network may coexist with cable television (CATV), where CATV delivery is not impacted by the addition of an ethernet/network data signal. In an embodiment, a data signal and CATV signal may be combined (and separated) using frequency selective bi-directional filters/splitters. For example, as shown in FIG. 3, in an embodiment root-PHY 222 may be provided with a diplex filter 236 (e.g., low frequency filter (LPF)=5-42 MHz; high frequency filter (HPF)= 54-1000 MHz) and splitter 238; each EP-PHY 224 may be provided with a complementary diplex filter 237 (e.g., low frequency filter (LPF)=5-42 MHz; high frequency filter (HPF)=54-1000 MHz) and splitter 239. In an exemplary embodiment, CATV signals generally may occupy frequencies above approximately 50 MHz, and ethernet data signals may occupy frequencies below approximately 50 MHz. The root-PHY 222 combines the LPF data signal with the HPF CATV signal and broadcasts the combined signals downstream over the coaxial cable 208 to each of the EP-PHYs 224. Each EP-PHY 224 then may utilize a splitter 238 to split the combined signals into an LPF data signal and an HPF CATV signal and processes and output the signals to respective ethernet port (e.g., 100TX Ethernet RJ-45 jack) 240 and TV connector 206. On the other hand, the EP-PHY 224 may transmit a data signal by transmitting the data signal via the diplex filter (LPF filter) 237 and splitter 239 over branch line 210 and trunk line 214 of the single conductor channel cabling 208 to the root-PHY 222. At root-PHY 222, the data signal is received via splitter 238 and diplex filter (LPF filter) 236 for further processing. In this manner, CATV signals may continue to be delivered over the system to the plurality of TVs 206 in each of a plurality of apartments/units 204 of the MTU building 202, while also providing ethernet communication between root-PHY 222 and EP-PHYs 224. Those skilled in the art readily will be able to select alternative respective operating frequencies or other distinguishing transmission characteristics of the CATV and ethernet signals suitable for a desired application.

Synchronization

In exemplary embodiments, point-to-multipoint synchronization may be maintained between the root-PHY 222 and each of the plurality of EP-PHYs 224 in a loop-timed manner. In an embodiment, root-PHY 222 may define a master clock (pulse signal) and transmit the master clock to the plurality of EP-PHYs 224, e.g., in a continuous signal. Each EP-PHY 224 may recover the master clock from the root-PHY's signal and use the recovered master clock to time its transmitter. In this manner, the plurality of EP-PHYs 224 in the network may be made synchronous to the master clock of the root-PHY 222, and thus to each other. It will be appreciated that this synchronization may enable digital echo cancellation, permitting full-duplex data transmission over a single conductor channel.

Rapid Receiver Training

In exemplary embodiments, a network of the present invention may provide rapid receiver training. Each EP-PHY 224 may use a continuous signal transmitted from the root-PHY 222 to synchronize with the network. In an embodiment, equalizer and timing phase in each EP-PHY 224 may be adapted in a traditional data directed manner based on a continuous signal transmitted from root-PHY 222. However, in an exemplary embodiment, a unique channel may exist in the upstream direction between each EP-PHY 224 and the root-PHY 222, and root-PHY 222 may use a different equalizer and timing phase for each EP-PHY 224. To accomplish this, in an embodiment root-PHY 222 may maintain, e.g., in memory, a table of equalizer coefficients and timing phases— one entry for each of the multiple EP-PHYs 224. When upstream control is transitioned to a specific EP-PHY 224, root-PHY 222 may load the pre-stored equalizer and timing phase for that EP-PHY 224. In an embodiment, each EP-PHY 224 may use a short preamble to verify proper operation has been achieved and to further refine the equalizer and timing phase. Equalizer and timing phase adaptation for an EP-PHY transceiver currently controlling the upstream channel may proceed in a traditional data directed manner. Initial coefficient and phase entry in the table may be updated with newly converged values. This process may allow for rapid switching between the multiple EP-PHYs 224 to minimize overhead of time-domain multiplexing of the upstream channel.

PHY Level Signaling

The network may use special PHY level signaling to permit standard IEEE 802.3 Media Access Control (MAC) protocols at both end points to control the network. In an exemplary embodiment, the root-PHY 222 may insert non-data characters (e.g., control characters or codes) into the continuous signal broadcast downstream, where plural control characters or codes respectively may grant access to a selected/designated one of the plural EP-PHYs 224 for upstream transmission. In an embodiment, when selected/designated EP-PHY 224 detects that it has been granted permission to transmit, it may de-assert the CRS (carrier sense) signal to it's standard half-duplex 802.3 MAC. The standard IEEE 802.3 HDX MAC may not transfer data to the EP-PHY transmitter while CRS is asserted. The EP-PHY (transmitter) may remain silent while CRS is asserted (rather than transmitting idle characters). The root-PHY 222 may grant access in a round robin manner or any other time-domain multiplexed (TDM) scheme to share the channel between the EP-PHYs 224. This process may allow a standard full-duplex 802.3 MAC to be used to control the root-PHY 222.

Network Expansion

In exemplary embodiments, a network of the present invention may be expandable. That is, EP-PHYs 224 may be added or deleted from the network. In an embodiment, when a new EP-PHY 224 is connected to the network, it may acquire synchronization and converge it's equalizer using a continuously broadcast signal from root-PHY 222. Root-PHY 222 may periodically announce an open interval for establishing new EP-PHY connections. Upon detection, a new EP-PHY 224 may wait a random time interval, to avoid collision with other new EP-PHYs 224, check again for access permission, and then begin transmitting to root-PHY transceiver 222. The root-PHY 222 may converge equalizer coefficients and timing phases for the new connection and append this information to a table of EP-PHY addresses stored in memory. The root-PHY 222 also may assign a PHY address to the new EP-PHY 224, indicating acknowledgement of the EP-PHY transmission. In an embodiment, if a new EP-PHY 224 does not receive acknowledgement, it may continue to try to establish a link at the next available open interval.

Exemplary Ethernet Communication Methods

Point-to-Point Ethernet Communication

Figure 5:
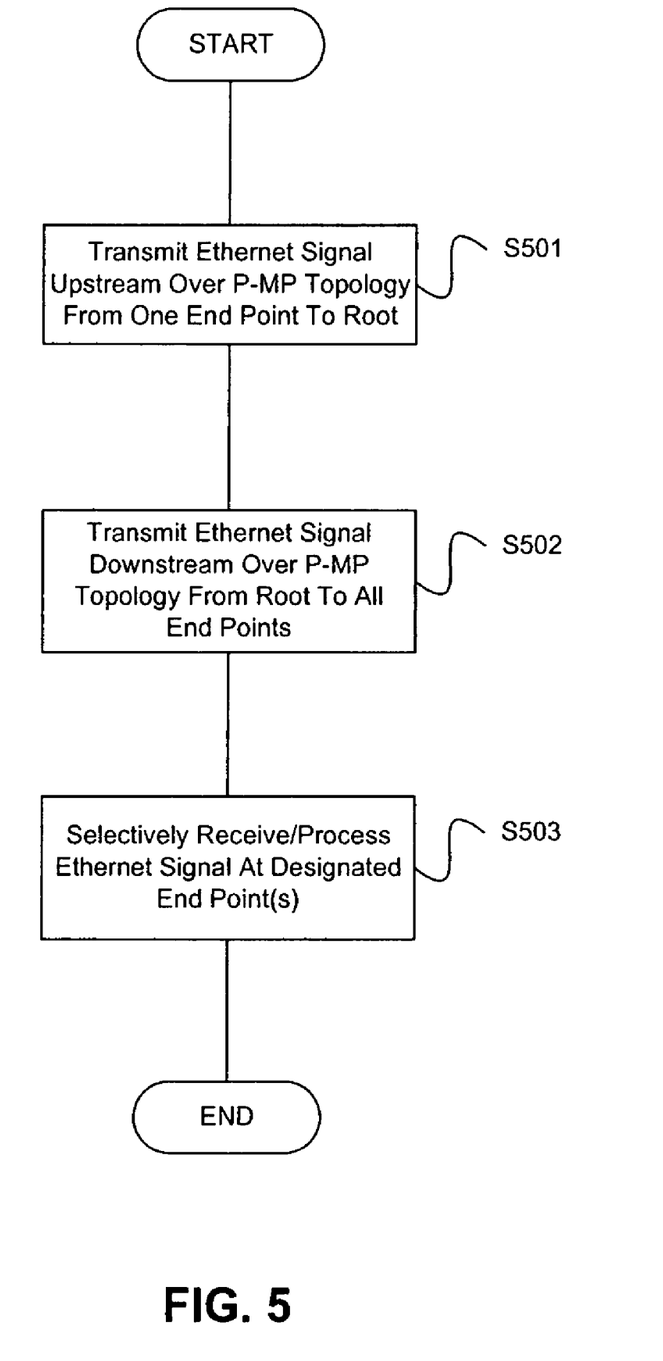
FIG. 5 is a flow chart illustrating an exemplary method for ethernet communication over point-to-multipoint topology according to the present invention.

FIG. 5 is a flow chart illustrating an exemplary method for point-to-point ethernet communication over point-to-multipoint topology according to the present invention. In an embodiment, at step 501, an ethernet signal is transmitted upstream over a point-to-multipoint shared single conductor channel topology from one end point of the network to the root of the network. In an exemplary embodiment, in the system of FIG. 2, data entered by a user at an external user interface connected to an EP-PHY 224 of the system may be transmitted upstream over coaxial cabling 208 in an ethernet signal from the EP-PHY 224 to the root-PHY 222. At step 502, the ethernet signal is transmitted downstream over the point-to-multipoint topology from the root of the network to all end points of the network. In an exemplary embodiment, in the system of FIG. 2, the ethernet signal may be re-transmitted downstream over the coaxial cabling 208 from the root-PHY 222 to all of the EP-PHYs 224. At step 503, the ethernet signal received at the end points is selectively processed at a designated end point(s). In an exemplary embodiment, in the system of FIG. 2, a selected EP-PHY 224 may be designated, e.g., by a code in a data packet of the received ethernet signal, and the designated EP-PHY 224 may decode the ethernet signal and output the data in the ethernet signal to an external user interface connected to the designated EP-PHY 224.

Combined Ethernet Communication and Media Transmission

Figure 6:
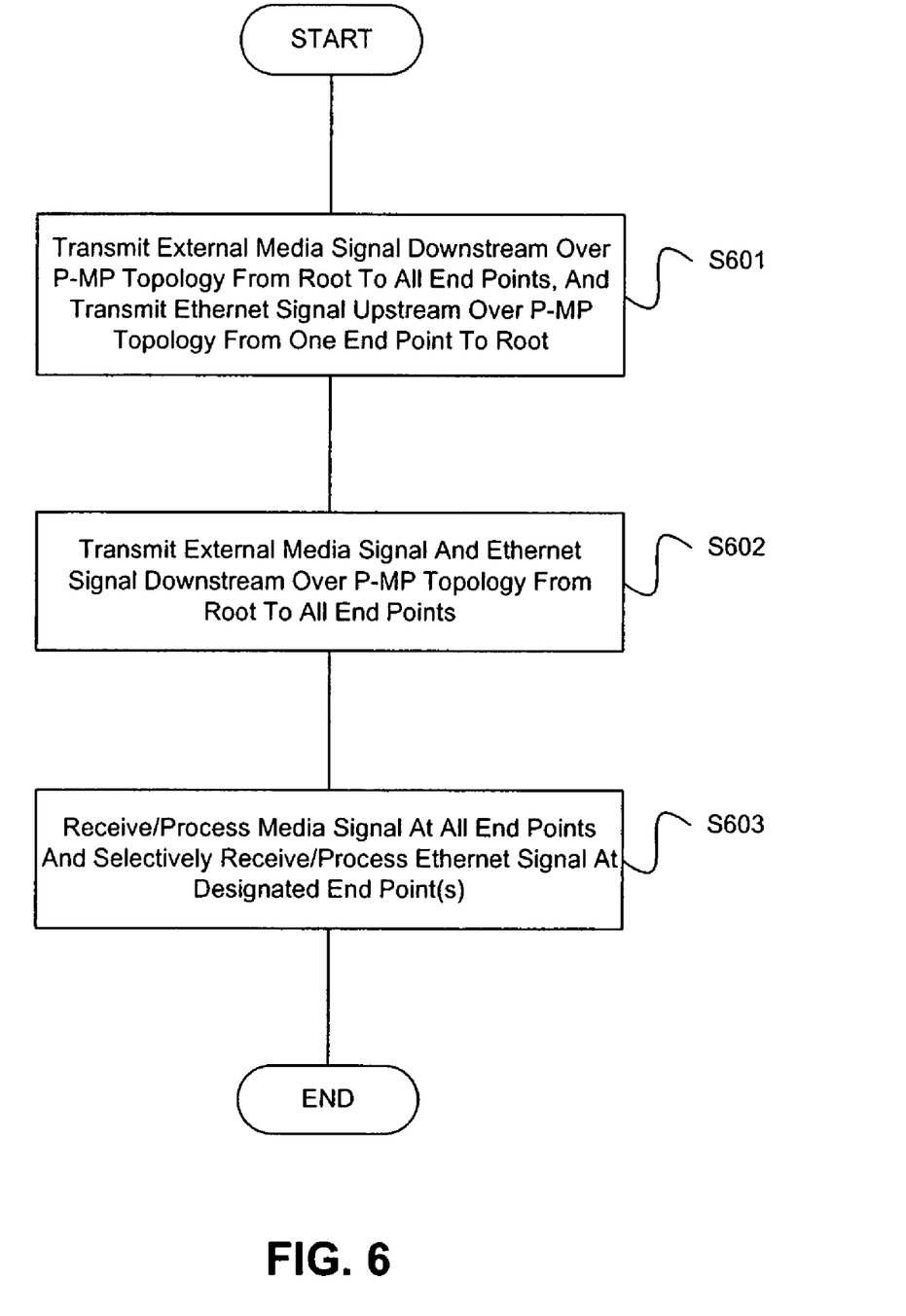
FIG. 6 is a flow chart illustrating an exemplary method for ethernet communication over point-to-multipoint topology according to the present invention.

FIG. 6 is a flow chart illustrating an exemplary method for combined ethernet communication and media transmission over point-to-multipoint topology according to the present invention. In an embodiment, at step 601 an external media signal is received and transmitted downstream over point-to-multipoint shared single line conductor channel topology from the root of the ethernet to all end points of the ethernet, and at the same time an ethernet signal is transmitted upstream over the point-to-multipoint topology from one end point of the ethernet to the root of the ethernet. In an exemplary embodiment, in the system of FIG. 2 a CATV signal may be received by the root-PHY 222 and transmitted downstream over coaxial cabling 208 to all of the EP-PHYs 224, and at the same time data entered by a user at a user interface connected to one EP-PHY 224 may be transmitted as an ethernet signal upstream over the coaxial cabling 208 from the one EP-PHY 224 to the root-PHY 222. At step 602, the external media signal is received and transmitted over the point-to-multipoint topology from the root of the ethernet to all of the end points of the ethernet, and the ethernet signal received at the root of the ethernet is re-transmitted downstream over the point-to-multipoint topology from the root of the ethernet to all of the end points of the ethernet. In an exemplary embodiment, in the system of FIG. 2, the CATV signal received by the root-PHY 222 may be transmitted downstream over the coaxial cabling 208, and the ethernet signal received by the root-PHY 222 from the one EP-PHY 224 may re-transmitted downstream over the coaxial cabling 208 to all of the EP-PHYs 224 in the system. At step 603, the media signal is received and processed at all of the end points of the ethernet, and the ethernet signal is received and processed at a designated end point(s). In an exemplary embodiment, in the system of FIG. 2, the CATV signal may be received and processed by all EP-PHYs 224, and a selected EP-PHY 224 may be designated, e.g., by a code in a data packet of the received ethernet signal, and the designated EP-PHY 224 may decode the ethernet signal and output the data to an external user interface connected to the designated EP-PHY 224.

Combined External Network Communication and Media Transmission

Figure 7:
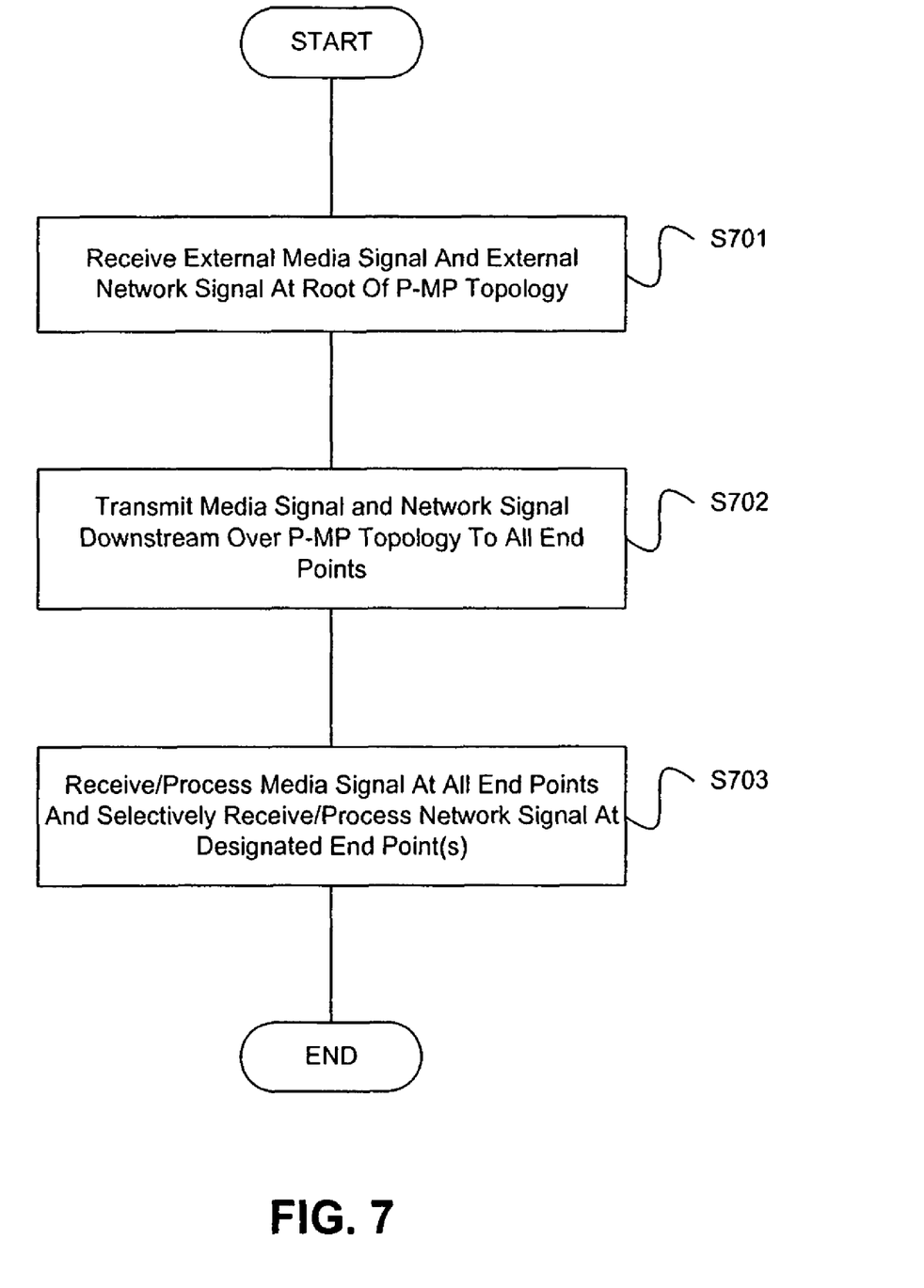
FIG. 7 is a flow chart illustrating an exemplary method for external network (e.g., internet) communication over point-to-multipoint topology according to the present invention.
Figure 8:
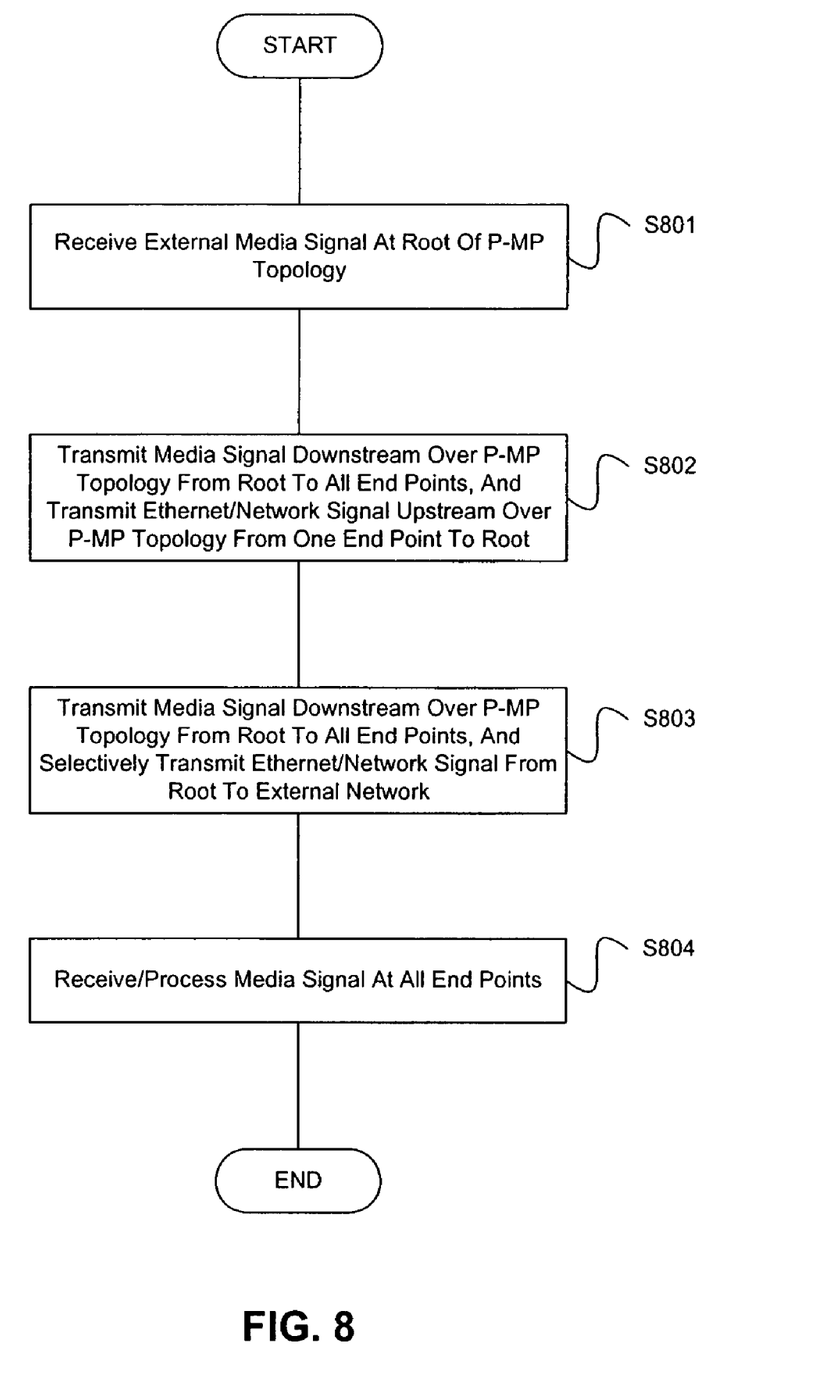
FIG. 8 is a flow chart illustrating an exemplary method for external network (e.g., internet) communication over point-to-multipoint topology according to the present invention.

In addition to providing point-to-point communication within an ethernet system, exemplary methods of the present invention may provide communication with a point in a network external to the ethernet system, e.g., the internet. FIGS. 7 and 8 illustrate embodiments of combined external network communications and media transmission.

FIG. 7 is a flow chart illustrating an exemplary method for communicating with an external network (e.g., the internet) over point-to-multipoint topology ethernet according to the present invention. In step 701, an external media signal and an external network signal are received at the root of a point-to-multipoint shared single line conductor channel topology ethernet. In an exemplary embodiment, in the system of FIG. 2, a CATV signal and a separate network signal (e.g., internet signal) may be received by the root-PHY 222. In step 702, the media signal and the network signal are transmitted downstream over the point-to-multipoint topology to all end points of the ethernet. In an exemplary embodiment, in the system of FIG. 2, the CATV signal and the network/ethernet signal may be transmitted together downstream over the coaxial cabling 208 from the root-PHY 222 to all of the EP-PHYs 224. In step 703, the media signal may be received and processed at all end points of the ethernet, and the network/ethernet signal may be selectively received and processed at a designated end point(s) of the ethernet. In an exemplary embodiment, in the system of FIG. 2, the CATV signal may be received and processed by all EP-PHYs 224 of the system (e.g, transmitted to an external TV for viewing), and a selected EP-PHY 224 may be designated, e.g., by a code in a data packet of the received network/ethernet signal, and the designated EP-PHY 224 may decode the network/ethernet signal and output the data to an external user interface connected to the designated EP-PHY 224.

FIG. 8 is a flow chart illustrating an exemplary method for communicating with an external network (e.g., the internet) over a point-to-multipoint topology ethernet according to the present invention. In step 801, an external media signal is received at the root of a point-to-multipoint shared single line conductor channel topology ethernet. In an exemplary embodiment, in the system of FIG. 2, a CATV signal is received at root-PHY 222. In step 802, the media signal is transmitted downstream over the point-to-point topology from the root of the ethernet to all end points of the ethernet, and an ethernet/network signal is transmitted upstream over the point-to-multipoint topology from one end point of the ethernet to the root of the ethernet. In an exemplary embodiment, in the system of FIG. 2, the CATV signal is transmitted downstream over the coaxial cabling 208 from the root-PHY 222 to all of the EP-PHYs 224, and at the same time data entered by a user at an external user interface connected to one EP-PHY 224 may be transmitted upstream over the coaxial cabling 208 from the one EP-PHY 224 to the root-PHY 222. In step 803, the media signal is transmitted downstream over the point-to-point topology from the root of the ethernet to all end points of the ethernet, and the ethernet signal is transmitted from the root of the ethernet to the external network (where it transmits to a designated destination/end point). In an exemplary embodiment, in the system of FIG. 2, the CATV signal may be transmitted downstream over the coaxial cabling 208 from the root-PHY 222 to all of the EP-PHYs 224, and the ethernet signal may be transmitted for the root-PHY 222 to the external network (e.g., the internet). In step 804, the media signal is received and processed at all end points of the ethernet. In an exemplary embodiment, in the system of FIG. 2, the media signal may be received and processed by each of the EP-PHYs 224 (e.g., transmitted to an external TV for viewing).

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An ethernet system comprising:
    single conductor channel cabling including a trunk line and a plurality of branch lines connecting to the trunk line at a plurality of points along the trunk line;
    a single root transceiver (root-PHY) connected at an end of the trunk line; and
    a plurality of end point transceivers (EP-PHYs), each connected to a respective one of the plurality of branch lines;
    the root-PHY being configured to receive a first signal from an external signal source and to transmit the first signal downstream over the single conductor channel cabling to each of the EP-PHYs, the first signal being an external signal, the root-PHY further being configured to receive data signals transmitted upstream over the single conductor channel cabling from the plurality of EP-PHYs, and to re-transmit the data signals downstream over the single conductor channel cabling to the plurality of EP-PHYS, and
    each EP-PHY being configured to receive the first signal transmitted downstream over the single conductor channel cabling and to transmit the first signal to a respective external end point device, each EP-PHY further being configured to selectively communicate with any other one of the plurality of EP-PHYs by transmitting a data signal upstream over the single conductor channel cabling to the root-PHY, the root-PHY re-transmitting the data signal downstream over the single conductor channel cabling to the plurality of EP-PHYs.

2. The system of claim 1, wherein the first signal is a cable television (CATV) signal.

3. The system of claim 1, wherein the first signal is a continuous signal.

4. The system of claim 1, wherein the data signal is a discontinuous signal.

5. The system of claim 1, wherein the first signal transmits in a first frequency range and the data signal transmits in a second frequency range different from the first frequency range.

6. The system of claim 1, wherein the root-PHY defines a master clock and transmits the master clock in a signal downstream over the single conductor channel cabling to the plurality of EP-PHYs, and wherein each EP-PHY recovers the master clock and synchronizes with the root-PHY.

7. The system of claim 6, wherein the plurality of EP-PHYs transmit respective burst signals upstream to the root-PHY on a time-domain multiplexed (TDM) basis.

8. The system of claim 6, wherein the plurality of EP-PHYs transmit respective burst signals upstream to the root-PHY on a round robin basis.

9. The system of claim 1, the root-PHY further being configured to communicate a data signal to/from an external network.

10. The system of claim 1,
the root-PHY further comprising a diplex filter that filters the first signal at a first frequency range and filters the data signal at a second frequency range different from the first frequency range;
the system further comprising a splitter that integrates the first signal and the data signal for transmission downstream over the trunk line; and
each EP-PHY further comprising a diplex filter that filters the first signal at the first frequency range and filters the data signal at the second frequency range different from the first frequency range, each EP-PHY being configured to receive from the cabling an integrated first signal and data signal, to output the first signal to a respective first output terminal, and to output the data signal to an ethernet port.

11. The system of claim 1, each EP-PHY being configured to detect if permission to transmit over the cabling is granted, to assert a carrier sense (CRS) signal to Media Access Control (MAC) when permission to transmit is not granted, and to de-assert the CRS signal when permission to transmit is granted.

12. An ethernet transceiver (root-PHY) comprising:
a single conductor channel cable input port;
a single conductor channel cable I/O port;
a first transmission module configured to receive a first signal from an external source via the cable input port and to output the first signal via the cable I/O port downstream over external single conductor channel cabling to a plurality of external end point transceivers (EP-PHYs), the external single conductor channel cable including a trunk line and a plurality of branch lines connecting to the trunk line at a plurality of points along the trunk line, each of the EP-PHYs being connected to a respective one of the plurality of branch lines, the first signal being an external media signal; and
a second transmission module configured to receive via the cable I/O port data signals transmitted upstream over the external single conductor channel cabling from respective EP-PHYs of the plurality of external EP-PHYS, and to re-transmit a received data signal via the cable I/O port downstream over the external single conductor channel cabling to the plurality of external EP-PHYs, the data signal indicating a selected one of the plurality of external EP-PHYs designated to receive the data signal.

13. The root-PHY of claim 12, further comprising:
a network I/O port;
the second transmission module further being configured to receive and transmit data signals over an external network via the network I/O port, and to receive and transmit the data signals to the plurality of external EP-PHYs.

14. An ethernet transceiver (EP-PHY) comprising:
a single conductor channel cable I/O port;
a single conductor channel cable output port;
a first module configured to receive via the single conductor channel cable I/O port a first signal from an external root transceiver (root-PHY), transmitted downstream over an external single conductor channel cable, and to output the first signal via the single conductor channel cable output port, the first signal being an external media signal received via the external root transceiver; and
a second module configured to transmit a first data signal via the single conductor channel cable I/O port upstream over the external single conductor channel cable to the root-PHY, the transmitted first data signal indicating a destination first external EP-PHY on the single conductor channel cable for data in the transmitted first data signal, and further configured to selectively receive via the single conductor channel cable I/O port a second data signal re-transmitted downstream over the external single conductor channel cable from the root-PHY, wherein the received second data signal originated from a second external EP-PHY on the single conductor channel cable, the received second data signal indicating that the receiving EP-PHY is a selected destination to receive and process data contained in the received second data signal.

15. The EP-PHY of claim 14, further comprising:
an ethernet I/O port;
the second module further being configured to receive a third data signal from an external end point device via the ethernet I/O port, and to transmit a fourth data signal to the external end point device via the ethernet I/O port.

16. A method for point-to-point ethernet communication over point-to-multipoint shared single conductor channel topology, comprising:
receiving an external media signal at a root of the point-to-multipoint topology;
filtering and transmitting the external media signal, within a first frequency range, downstream over the point-to-multipoint topology from the root of the topology to all end points of the topology;
processing the external media signal received at the end points of the point-to-multipoint topology;
filtering and transmitting an ethernet data signal, within a second frequency range different from the first frequency range, upstream over the point-to-multipoint topology from one end point of the topology to the root of the topology;
re-transmitting the ethernet data signal, within the second frequency range, downstream over the point-to-multipoint topology from the root of the topology to all end points of the topology; and
selectively processing, only at a designated end point of the topology, the ethernet data signal received at the end points of the topology.

17. The method of claim 16, further comprising:
transmitting a code in the ethernet data signal identifying the designated end point of the topology for selectively processing the ethernet data signal.

18. The method of claim 17, further comprising:
transmitting the code in a data packet of data identifying the designated end point of the topology for selectively processing the ethernet data signal.

19. The method of claim 17, further comprising:
processing the ethernet data signal at the designated end point of the topology and outputting data in the ethernet data signal to an external user interface connected to the designated end point.

20. The method of claim 16, further comprising:
entering data at an external user interface connected to the one end point of the point-to-multipoint topology as the ethernet data signal.

21. A method for point-to-point ethernet communication over point-to-multipoint shared single conductor channel topology, comprising:
receiving an external network data signal at a root of the point-to-multipoint topology;
filtering and transmitting the external network data signal, within a first frequency range, downstream over the point-to-multipoint topology from the root of the topology to all end points of the topology;
selectively processing the external network data signal at an end point of the topology designated by the external network data signal;
filtering and transmitting an ethernet data signal, within a second frequency range that is within the first frequency range, upstream over the point-to-multipoint topology from one end point of the topology to the root of the topology;
re-transmitting the ethernet data signal, within the second frequency range, downstream over the point-to-multipoint topology from the root of the topology to all end points of the topology; and
selectively processing the ethernet data signal at an end point of the topology designated by the ethernet data signal.

22. The method of claim 21, further comprising:
receiving an interne signal as the external network data signal.

23. The method of claim 16, further comprising:
transmitting an ethernet/network data signal upstream over the point-to-multipoint topology from one end point of the topology to the root of the topology; and
selectively transmitting the ethernet/network data signal from the root of the topology to an external network in accordance with the ethernet/network data signal.

24. The method of claim 23, further comprising:
processing a code in the ethernet/network data signal at the root of the topology and selectively transmitting the ethernet/network data signal to the external network in accordance with the code.

* * * * *

UNITED STATES PATENT AND TRADEMARK OFFICE
CERTIFICATE OF CORRECTION

| | | |
|---|---|---|
| PATENT NO. | : 8,098,691 B2 | Page 1 of 1 |
| APPLICATION NO. | : 11/907500 | |
| DATED | : January 17, 2012 | |
| INVENTOR(S) | : Powell et al. | |

It is certified that error appears in the above-identified patent and that said Letters Patent is hereby corrected as shown below:

Column 12
Line 53, please replace "external" with --external media--.

Column 16
Line 14, please replace "interne" with --internet--.

Signed and Sealed this
Twenty-second Day of May, 2012

David J. Kappos
*Director of the United States Patent and Trademark Office*